United States Patent
Karri et al.

(10) Patent No.: US 11,064,383 B2
(45) Date of Patent: Jul. 13, 2021

(54) INTELLIGENT IMS BASED ON REAL-TIME BASEBAND FEEDBACK

(71) Applicant: Apple Inc., Cupertino, CA (US)

(72) Inventors: Sai Sravan Bharadwaj Karri, Morgan Hill, CA (US); Sethuraman Gurumoorthy, San Jose, CA (US); Sree Ram Kodali, Sunnyvale, CA (US); Stephen C. Schweizer, Mountain View, CA (US); Alexander Allahverdiev, Walnut Creek, CA (US); Murtaza A. Shikari, Mountain View, CA (US); Srirang A. Lovlekar, Cupertino, CA (US); Vijay Venkataraman, Sunnyvale, CA (US); Wanping Zhang, San Jose, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 16/362,572

(22) Filed: Mar. 22, 2019

(65) Prior Publication Data
US 2020/0305019 A1    Sep. 24, 2020

(51) Int. Cl.
*H04W 28/02* (2009.01)
*H04L 29/06* (2006.01)
*H04W 24/02* (2009.01)

(52) U.S. Cl.
CPC ..... *H04W 28/0236* (2013.01); *H04L 65/1006* (2013.01); *H04L 65/1016* (2013.01); *H04L 65/1073* (2013.01); *H04L 65/80* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 2005/0086327 A1* | 4/2005 | Mayer | H04L 65/105 709/219 |
| 2006/0215604 A1* | 9/2006 | Mueckenheim | H04W 72/1252 370/329 |
| 2012/0202557 A1* | 8/2012 | Olofsson | H04W 36/14 455/525 |
| 2013/0121172 A1* | 5/2013 | Cheng | H04W 52/0222 370/252 |

* cited by examiner

*Primary Examiner* — James P Duffy
(74) *Attorney, Agent, or Firm* — Kowert, Hood, Munyon, Rankin & Goetzel, P.C.

(57) ABSTRACT

Apparatuses, systems, and methods for improving efficiency in IMS registration and management in a wireless communication device, such as a UE. In some scenarios, the UE may, while implementing IMS services (e.g. for VoLTE) over a wireless communication link with a cellular network, determine that the wireless communication link is not performing at an acceptable level. In response, the UE may start a timer and buffer IMS SIP signaling messages while the timer is running. If the wireless communication link performance is restored to an acceptable level before expiration of the timer, the UE may transmit the buffered IMS SIP signaling messages. If the timer expires prior to restoration of the wireless communication link, the buffered messages may be cleared, and the UE may locally deregister from IMS registration and IMS PDN. In some scenarios, select IMS SIP signaling messages may be omitted or removed from the buffer.

19 Claims, 10 Drawing Sheets

INTELLIGENT IMS BASED ON REAL-TIME BASEBAND FEEDBACK

FIELD

The present application relates to wireless devices, and more particularly to apparatus, systems, and methods for managing IMS signaling utilizing baseband feedback.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Fourth generation (4G) and fifth generation (5G) cellular networks employing newer radio access technology (RAT) systems that implement the 3rd Generation Partnership Project (3GPP) Long Term Evolution (LTE), LTE Advanced (LTE-A), and/or 5G New Radio (5G-NR) standards are rapidly being developed and deployed within the United States and abroad. Many different types of 4G/5G-compliant communication devices have been introduced into the consumer electronic device marketplace. Some such wireless networks offer high data services and packetized voice service, e.g., voice over LTE (VoLTE). Some 4G/5G wireless communication devices are capable of communicating within heterogeneous telecommunication networks that employ a diverse mixture of 4G/5G, third generation (3G), and second generation (2G) RAT systems. Accordingly, these multi-mode communication devices are configured with radio frequency (RF) circuitry that allows the devices to readily transition between 4G/5G network cells, as well as to roam amongst and transition between various 3G and 2G legacy network cells. By way of example, 3G legacy RATs may include Universal Mobile Telecommunications System (UMTS)/High Speed Packet Access (HSPA) and Code Division Multiple Access (CDMA) 2000/1× Evolution-Data Only (1×EV-DO) systems, whereas 2G legacy RATs can include Global System for Mobile Communications (GSM)/ Enhanced Data Rate for GSM Evolution (EDGE) systems.

Additionally, 4G/5G multi-mode communication devices can be configured to perform different voice calling functions using a packet-based communication protocol (e.g., VoLTE) or a circuit-switched 3G or 2G legacy communication protocol. The choice of which voice communication protocol the mobile device uses depends on what RATs are available to the device at its present network location. For instance, when a multi-mode communication device operates within a coverage area of an LTE/LTE-A network cell, the device can be configured to initiate a voice call using a VoLTE communications protocol, when the LTE/LTE-A network cell supports VoLTE calls. In another scenario, when the same device operates within a coverage area of a 3G or 2G legacy network cell and LTE network access is otherwise unavailable, the multi-mode communication device may be configured to initiate a voice call using a legacy circuit-switched communications protocol, such as through a 3G or 2G legacy network cell.

Generally, multi-mode communication devices are configured to prefer communication via 4G/5G networks offering relatively high data-rate throughput, as opposed to communication via 3G or 2G legacy wireless networks that offer substantially lower data-rate throughput. However, in some scenarios, IMS signaling supporting such packet-based communications may become inefficient, especially when registration/deregistration is performed frequently, e.g., when 4G/5G signal quality is poor. Such inefficiency may lead to increased power consumption, as well as communication channel congestion.

Consequently, advances are desired in improving efficiency of IMS signaling.

SUMMARY

Embodiments relate to apparatuses, systems, and methods for improving efficiency in Internet Protocol (IP) Multimedia Subsystem (IMS) registration and management procedures.

For example, a method is disclosed, in which a user equipment device (UE) may register for IMS services on an IMS Public Data Network (PDN) connection established over a wireless communication link with a cellular network. After registering, the UE may determine that the wireless communication link is not performing at an acceptable level. In response, the UE may begin buffering IMS SIP signaling messages generated by the UE. At a later time, the UE may determine that the wireless communication link has been restored to an acceptable performance level. In response, the UE may transmit the buffered IMS SIP signaling messages to the cellular network, and may cease buffering of IMS SIP signaling messages generated by the UE.

In some scenarios, in response to determining that the wireless communication link is not performing at an acceptable level, the UE may maintain IMS PDN context information and/or IMS registration context information for use in sending the buffered IMS SIP signaling messages.

In some scenarios, determining that the wireless communication link is not performing at an acceptable level may include determining that service with the cellular network has been lost.

In some scenarios, in response to determining that the wireless communication link is not performing at an acceptable level, the UE may suspend communication via the IMS PDN connection due to poor performance of the wireless connection link, although service with the cellular network has not been lost.

In some scenarios, in response to determining that the wireless communication link is not performing at an acceptable level, the UE may start a message preservation timer, wherein transmitting the buffered IMS SIP signaling messages to the cellular network is further in response to determining that the wireless communication link has been restored prior to expiration of the message preservation timer. The buffered IMS SIP signaling messages may not be transmitted if the message preservation timer expires prior to receiving the indication that the wireless communication link has been restored.

In some scenarios, the wireless communication link may be established according to a first radio access technology (RAT). The UE may establish a second wireless communication link with the cellular network according to a second RAT during a period of time between determining that the wireless communication link is not performing at an acceptable level and determining that the wireless communication link has been restored.

As another example, a UE is disclosed, which may include a baseband processor configured to establish a wireless communication link with a cellular network, and at least one application processor. The at least one application processor may be configured to execute software instructions to perform steps similar to the method described above. For example, the at least one application processor may register for IMS services on an IMS PDN connection established over the wireless communication link. The at least one application processor may receive from the baseband processor, after registering for IMS services, an indication that the wireless communication link is not performing at an acceptable level, and in response, may begin buffering IMS SIP signaling messages generated by the UE. The at least one application processor may receive from the baseband processor an indication that the wireless communication link has been restored to an acceptable performance level, and in response, may send the buffered IMS SIP signaling messages to the cellular network, and cease buffering of IMS SIP signaling messages generated by the UE.

In some scenarios, in response to receiving the indication that the wireless communication link is not performing at an acceptable level, the at least one application processor may maintain IMS PDN context information and/or IMS registration context information for use in sending the buffered IMS SIP signaling messages.

In some scenarios, the indication that the wireless communication link is not performing at an acceptable level may include an indication of loss of service with the cellular network. In other scenarios, the indication may include an indication that the baseband processor will suspend communication via the IMS PDN connection due to poor performance of the wireless connection link, although service with the cellular network has not been lost.

In some scenarios, the at least one application processor may, in conjunction with beginning buffering IMS SIP signaling messages, start a message preservation timer, wherein sending the buffered IMS SIP signaling messages to the cellular network is further in response to determining that the indication that the wireless communication link has been restored was received prior to expiration of the message preservation timer. In response to determining that the message preservation timer has expired prior to receiving the indication that the wireless communication link has been restored, the at least one application processor may clear from memory the buffered IMS SIP signaling messages and/or clear from memory IMS PDN context information and IMS registration context information.

In some scenarios, the wireless communication link may be established according to a first RAT. The baseband processor may be further configured to establish a second wireless communication link with the cellular network according to a second RAT during a period of time between the at least one application processor receiving the indication that the wireless communication link is not performing at an acceptable level and the at least one application processor receiving the indication that the wireless communication link has been restored.

In some scenarios, the at least one application processor may determine that one or more of the buffered IMS SIP signaling messages is outdated, and in response, omit the one or more IMS SIP signaling messages from the buffer.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
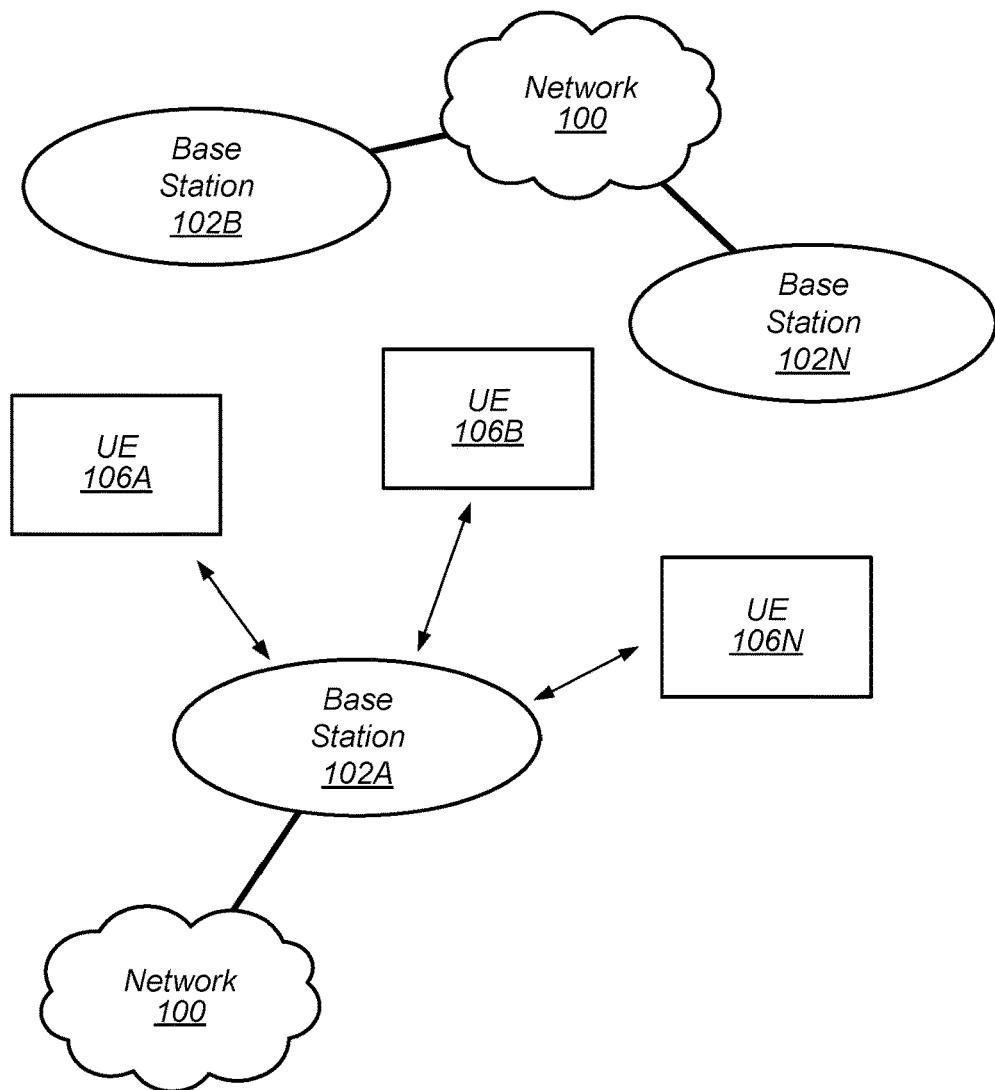
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 2:
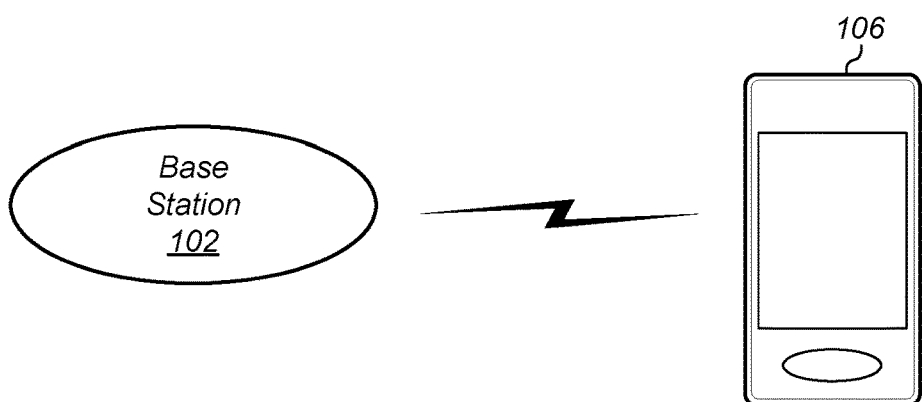
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G New Radio (5G-NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or eNB'. Note that if the base station 102A is implemented in the context of 5G-NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus provide a network of cells, which may provide continuous or nearly continuous overlapping service to UEs 106A-N and similar devices over a geographic area via one or more cellular communication standards.

Thus, while base station 102A may provide a "serving cell" for UEs 106A-N as illustrated in FIG. 1, each UE 106 may also be capable of receiving signals from (and possibly be within communication range of) one or more other cells (which might be provided by base stations 102B-N and/or any other base stations), which may be referred to as "neighboring cells". Base stations providing such cells may also be capable of facilitating communication between user devices and/or between user devices and the network 100. The neighboring cells may include "macro" cells, "micro" cells, "pico" cells, and/or cells which provide any of various other granularities of service area size. For example, base stations 102A-B illustrated in FIG. 1 might provide macro cells, while base station 102N might provide micro cells. Other configurations are also possible.

In some embodiments, base station 102A may be a next generation base station, e.g., a 5G New Radio (5G-NR) base station, or "gNB". In some embodiments, a gNB may be connected to a legacy evolved packet core (EPC) network and/or to a NR core (NRC) network. In addition, a gNB may include one or more transmission and reception points (TRPs), which may include an antenna panel (i.e., a panel containing one or more arrays of antenna elements). In addition, a UE capable of operating according to 5G-NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G-NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), and/or digital processing circuitry (e.g., for digital modulation as well as other digital processing). Similarly, the radio may implement one or more receive and/or transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and/or other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G-NR (or LTE or 1×RTT, or LTE or GSM), and separate radios for communicating using each of Wi-Fi and Bluetooth. Other configurations are also possible.

Figure 3:
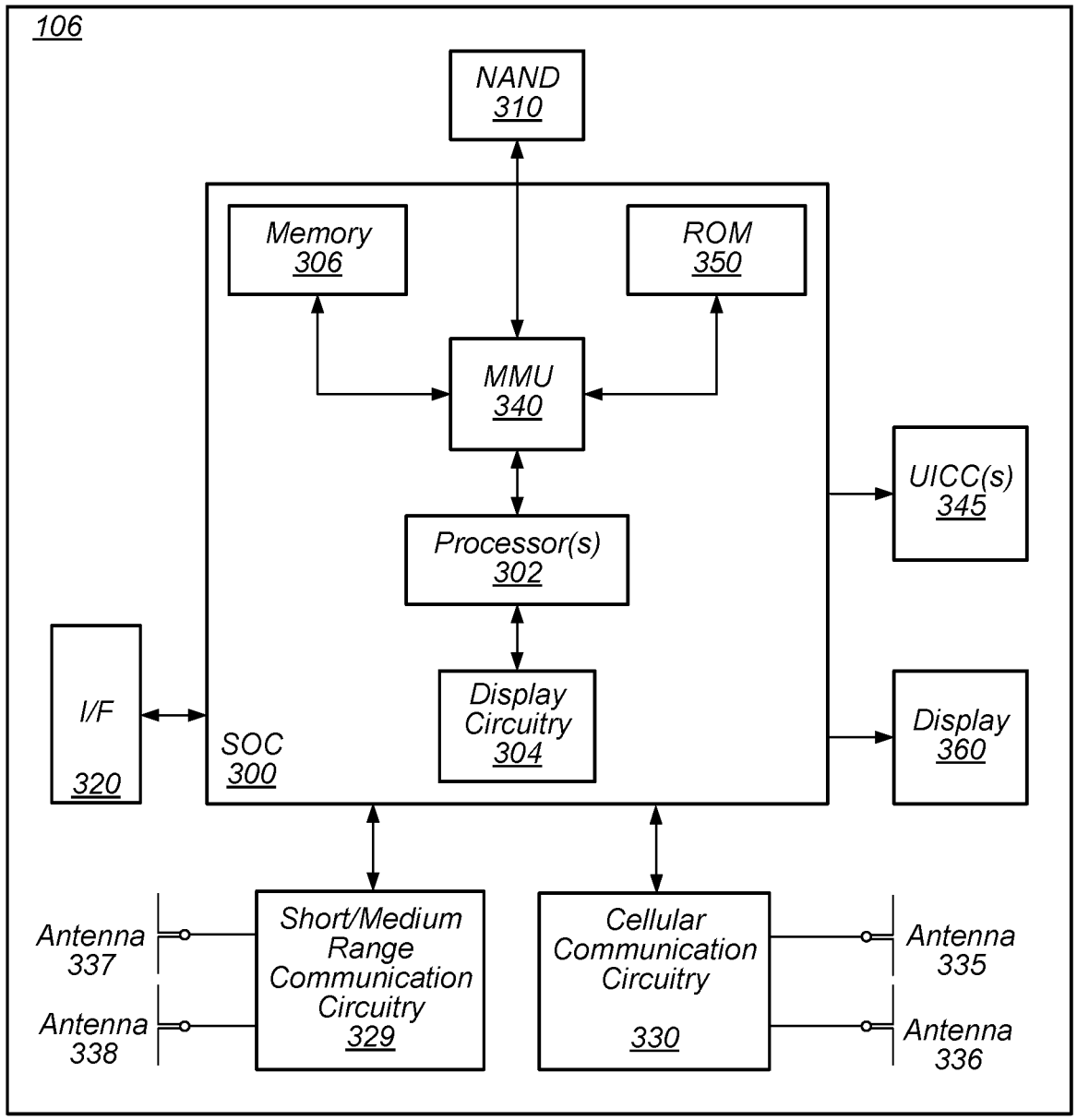
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface (I/F) such as connector I/F 320 (e.g., for connecting to a computer system; dock; charging station; input devices, such as a microphone, camera, keyboard; output devices, such as speakers; etc.), the display 360, which may be integrated with, or external to, the communication device 106, cellular communication circuitry 330 such as for 5G-NR, LTE, GSM, etc., and short- to medium-range wireless communication circuitry 329 (e.g., Bluetooth™ and/or WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short- to medium-range wireless communication circuitry 329 may also couple (e.g., communicatively; directly or indirectly) to one or more antennas, such as antennas 337 and 338 as shown. Alternatively, the short- to medium-range wireless communication circuitry 329 may couple (e.g., communicatively; directly or indirectly) to the antennas 335 and 336 in addition to, or instead of, coupling to the antennas 337 and 338. The short- to medium-range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G-NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G-NR, and may be in communication with a dedicated receive chain and the shared transmit chain.

The communication device 106 may also include and/or be configured for use with one or more user interface elements. The user interface elements may include any of various elements, such as the display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. In some scenarios, the processor(s) 302 may include (e.g., may constitute) an application processor (AP). The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short- to medium-range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method as disclosed below.

As described herein, the communication device 106 may include hardware and software components for implementing the above features for a communication device 106 to implement and manage IMS signaling utilizing baseband feedback. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and/or short- to medium-range wireless communication circuitry 329 may each include one or more processing elements. In other words, one or more processing elements may be included in cellular communication circuitry 330 and, similarly, one or more processing elements may be included in short- to medium-range wireless communication circuitry 329. Thus, cellular communication circuitry 330 may include one or more integrated circuits (ICs) configured to perform some or all of the functions of cellular communication circuitry 330. The one or more ICs may include a baseband processor, which may constitute either a dedicated processor or a general processor implementing a baseband processing module. In addition, each integrated circuit may include circuitry (e.g., first circuitry, second circuitry, etc.) configured to perform the functions of cellular communication circuitry 330. Similarly, the short- to medium-range wireless communication circuitry 329 may include one or more ICs configured to perform some or all of the functions of short- to medium-range wireless communication circuitry 329. In addition, each integrated circuit may include circuitry (e.g., first circuitry, second circuitry, etc.) configured to perform the functions of short-to medium-range wireless communication circuitry 329.

Figure 4:
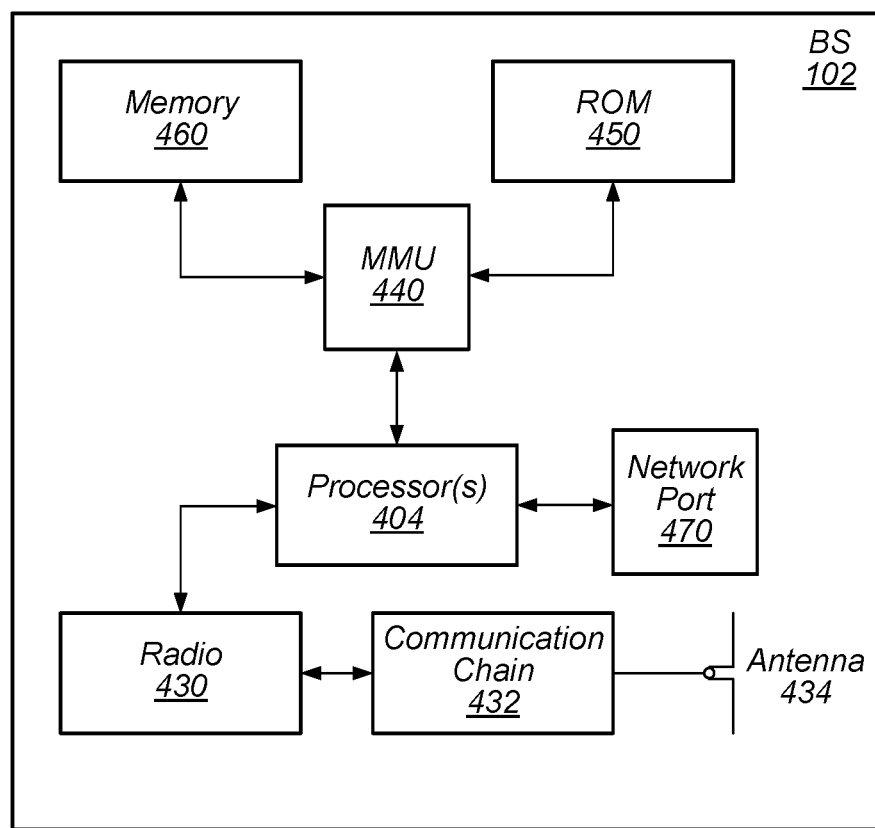
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G-NR) base station, or "gNB". In such embodiments, base station 102 may be connected to a legacy evolved packet core (EPC) network and/or to a NR core (NRC) network. In addition, base station 102 may provide one or more a 5G-NR cells and may include one or more transmission and reception points (TRPs). In addition, a UE capable of operating according to 5G-NR may be connected to one or more TRPs within one or more gNBs.

The base station 102 may include at least one radio 430, which may be configured to operate as a wireless transceiver and may be further configured to communicate with UE devices 106 via one or more antenna 434. The one or more antenna 434 may include, or constitute, one or more transmission and reception point (TRP). The one or more antenna 434 may include one or more antenna panel and/or one or more antenna of other format(s). For example, in some scenarios, each antenna panel of the one or more antenna 434 may include, or constitute, a respective TRP. The one or more antenna 434 may communicate with the radio 430 via communication chain 432. Communication chain 432 may be a receive chain, a transmit chain or both. In some scenarios, the radio 430 and the communication chain 432 together may be considered a wireless transceiver. The radio 430 may be configured to communicate via various wireless communication standards, including, but not limited to, 5G-NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G-NR radio for performing communication according to 5G-NR. In such a case, the base station 102 may be capable of operating as both an LTE base station and a 5G-NR base station. As another possibility, the base station 102 may include a multi-mode radio which is capable of performing communications according to any of multiple wireless communication technologies (e.g., 5G-NR and Wi-Fi, LTE and Wi-Fi, LTE and UMTS, LTE and CDMA2000, UMTS and GSM, etc.).

As described further subsequently herein, the base station 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. For example, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
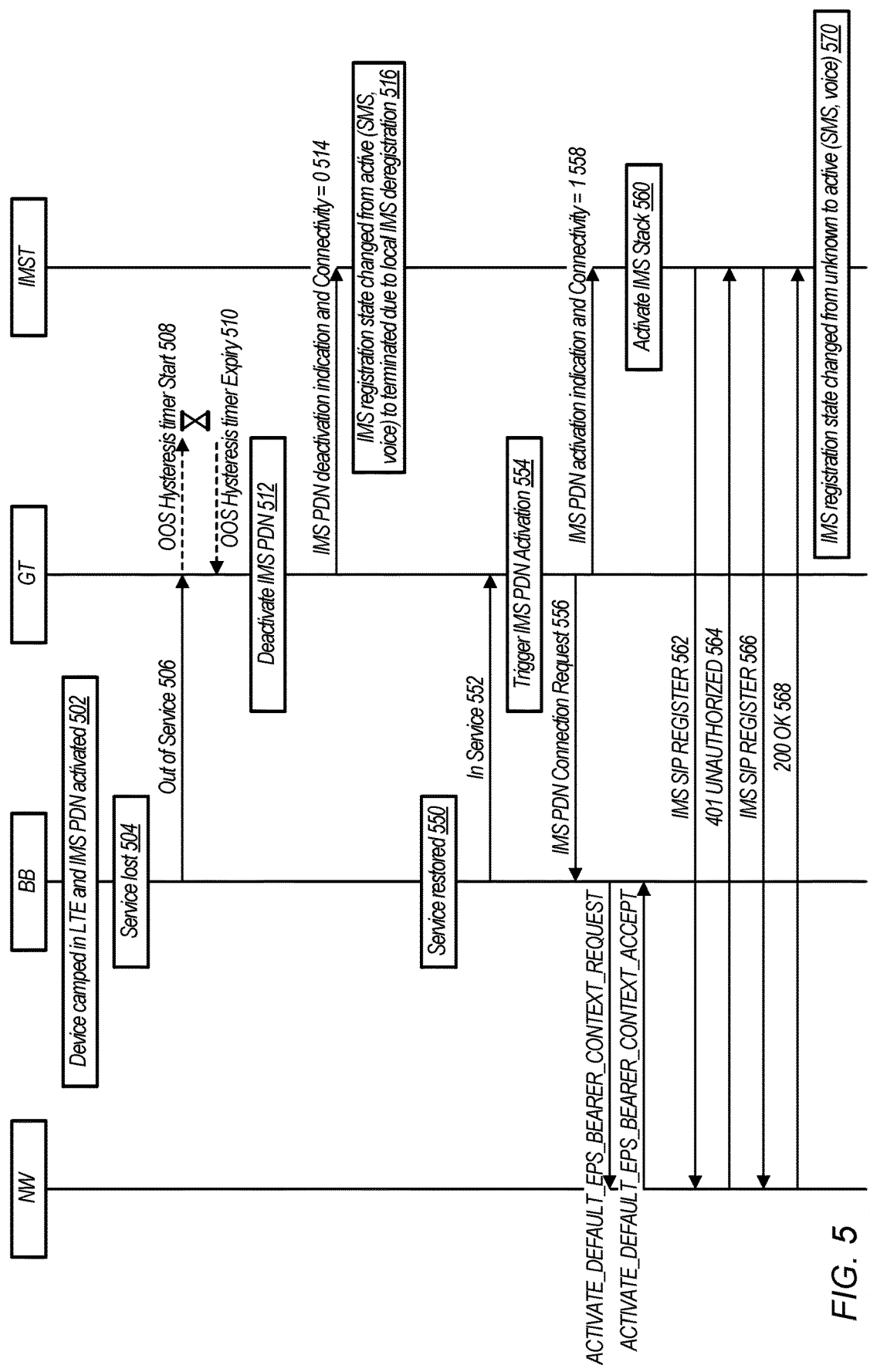
FIG. 5 illustrates an example signal flow diagram of a user device managing IMS SIP signaling while experiencing an out-of-service scenario, according to some embodiments.
Figure 6:
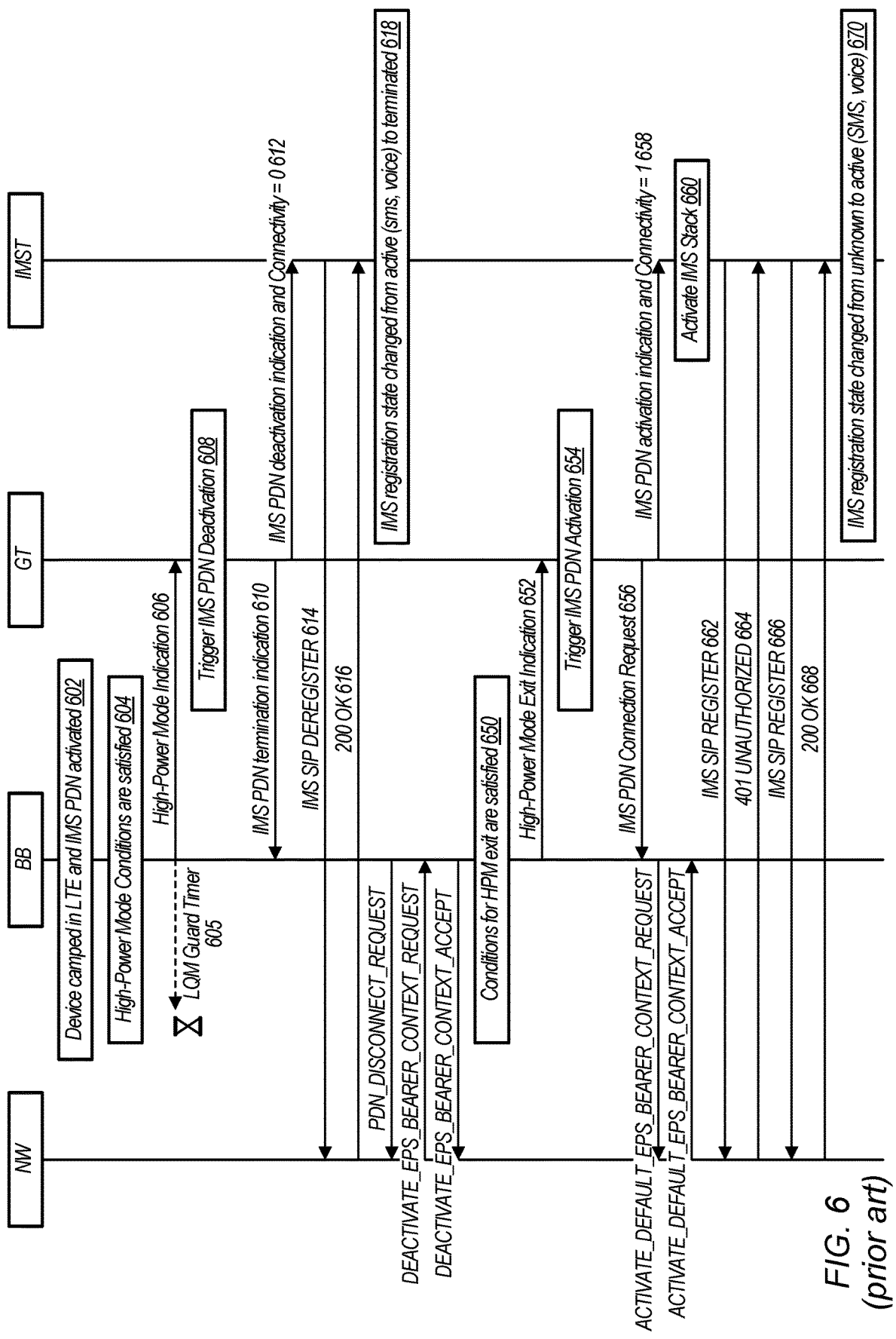
FIG. 6 illustrates an example signal flow diagram of a user device managing IMS SIP signaling while experiencing a high-power mode scenario, according to some embodiments.

FIGS. 5-6—Inefficiencies Due to Connection Loss

In some scenarios, packet-based communications (e.g., VoLTE) may be performed over IMS bearers. Thus, when a user device (such as the communication device 106) powers on or otherwise connects with an applicable (e.g., IMS-supporting) network, and on certain other occasions, the user device may register for IMS services. In some scenarios, IMS registration/deregistration and/or other IMS control functions may be performed using IMS session initiation protocol (SIP) messaging. Once the IMS registration procedure is complete, the user device is considered to be registered with the network for IMS communications. While the user device remains registered for IMS communications, voice calls and/or certain other communications originated or terminated at the user device may be transmitted or received over the IMS bearers.

The network may indicate, e.g., during the IMS registration procedure, how long the registration is valid. This duration may vary, e.g., based on the cellular service provider or other factors. Common values may include 40 minutes, 60 minutes, or 120 minutes, though other values are also possible. Upon (or prior to) expiry of the specified registration duration, the user device may transmit an IMS registration refresh message, to signal to the network that the user device desires to remain registered with the network for IMS service. Failure of the user device to successfully transmit a registration refresh message within the specified time may result in deregistration of the user device by the network and cleaning up of any user-device-specific IMS context information maintained by the network.

Alternatively, the user device may explicitly initiate a deregistration procedure with the network, e.g., if the user device intends to terminate IMS communications. This may occur, for example, if the user device transitions to a legacy RAT while communications are still possible with the network via the IMS-supporting RAT.

Certain scenarios may lead to inefficiencies in managing IMS SIP signaling. FIGS. 5-6 illustrate examples of two such scenarios, as may be encountered when utilizing traditional systems.

FIG. 5 illustrates a signal flow diagram of a user device managing IMS SIP signaling while experiencing an out-of-service scenario, according to some embodiments. As illustrated, the signal flow may include signals between a network (NW), a baseband (BB) module, a general telephony (GT) module, and anIMS telephony (IMST) module. The NW may include any network entity or entities appropriate for communicating the indicated signals, and would typically include at least a base station (such as the base station 102). The BB module, GT module, and IMST module may be included in a user device, such as the communication device 106.

The BB module may implement the cellular protocol stack, and may control the over-the-air interface for communications with the NW. For example, the BB module may perform IMS Public Data Network (PDN) establishment, maintenance, and release, e.g., under instruction from the GT module and/or the IMST module. The BB module may include, consist of, or be included in a baseband processor. For example, the BB module may include one or more processing elements (e.g., ICs or other hardware) within the cellular communication circuitry 330, for performing baseband processing functions. As another example, the BB module may include a software module, e.g., implemented on a more general processor of the cellular communication circuitry 330. The BB module may communicate with the NW, e.g., via a transceiver chain and/or other appropriate components of the cellular communication circuitry 330, and one or more antenna(s), such as the antennas 335 and 336.

The GT module and the IMST module may each include a software module implemented on a processor of the communication device 106, such as an AP included in the processor(s) 302. Thus, in such scenarios, the functions of both the GT module and the IMST module may be alternatively described as being performed by the AP. In other scenarios, the GT module and the IMST module may be implemented on different (i.e., separate) processors of the communication device 106. In yet other scenarios, the GT module and/or the IMST module may include one or more hardware modules for performing their respective functions. The GT module may be configured to implement general telephony functions, and may interact with the BB module, e.g., to ensure establishment of a wireless link in support of telephony functions. The IMST module may be configured to implement functions particularly pertaining to packed-based telephony, such as implementing the IMS stack. Thus, the IMST module may control IMS SIP signaling, communicated via the IMS bearers established by the BB module.

As illustrated in FIG. 5, the signal flow may begin at 502 with the user device camped on a serving cell according to a first RAT that supports packet-based telephony (e.g., LTE), and with an IMS PDN connection established. IMS registration may also have been previously performed. The camping procedure, the IMS PDN establishment, and the IMS registration may have been performed according to any method known in the art.

At 504, the BB module may determine that the user device is out of service with the NW according to the first RAT. For example, the BB module may observe failure of a cell selection criteria check with the serving cell, a RACH failure, an RRC connection error, etc. In other scenarios, the user device may intentionally drop service with the first RAT, e.g., in order to connect to the NW (or a different network) via a second RAT, such as when falling back to a circuit-switched network (e.g., a 2G or 3G network). As a result of the loss of service, the user device may be unable to communicate effectively with the NW via the first RAT.

In response to this determination at 504, the BB module may, at 506, provide an indication to the GT module that the service connection to the NW via the first RAT has been interrupted (e.g., lost). For example, the indication may be, or be included in, an out-of-service message, in some scenarios, though other formats are also possible.

In response to receiving the indication at 506, the GT module may start an out-of-service (OOS) hysteresis timer at 508. The GT module may stop the OOS hysteresis timer if, before the timer expires, the BB module provides an indication that service has been restored with the NW via the first RAT. The GT module may delay taking other action in response to the indication of 506 until the OOS hysteresis timer expires. Specifically, it may be undesirable to take action each time service is only momentarily interrupted. Instead, the GT module may utilize the OOS hysteresis timer to delay taking action until service has been interrupted for some minimum period of time (e.g., 30 sec, 45 sec, 60 sec, or some other period).

In the scenario illustrated in FIG. 5, service according to the first RAT remains interrupted, and the GT module therefore does not receive any indication to the contrary from the BB module prior to expiration of the OOS hysteresis timer at 510. In response to expiration of the OOS hysteresis timer, the GT module may, at 512, deactivate the IMS PDN connection, and may notify any clients of the GT module of the IMS PDN deactivation. In some scenarios, the GT module may omit use of the OOS hysteresis timer, and may proceed directly to 512 in response to receiving the indication at 506. Deactivating the IMS PDN connection may include locally deregistering from the IMS PDN connection and/or clearing (e.g., removing from memory) any IMS PDN context information. IMS PDN context information may include some or all of information such as IMS access point name, corresponding PDN identifiers, traffic flow templates for traffic routing, EPS bearer ID mapping, linked EPS bearer ID information, QCI configuration, etc. Because the user device has lost service with the NW, the GT module may not attempt to deregister with the NW. The GT module may also, at 514, provide to the IMST module an indication that connectivity to the network has been interrupted (e.g., Connectivity=0) and/or an indication IMS PDN has been deactivated (IMS PDN deactivation indication).

In response to receiving the indication(s) at 514, the IMST module may, at 516, take various steps to terminate IMS SIP signaling and locally deregister from IMS SIP. For example, the IMST module may update a record of the IMS registration state from active (e.g., for SMS and/or voice messages) to terminated, clear from memory any IMS registration context information, and/or deactivate the SIP signaling stack. IMS registration context information may include some or all of information such as a Unique Resource Identifier (URI), PCSCP address, server and client port information, a source and destination IPv6 address assigned by the network to the user device, registration and refresh timers, session ID, security and authentication parameters, etc.

It should be understood that, during the period in which service according to the first RAT is interrupted, the user device may, in some scenarios, be capable of communicating with the network via another (non-IMS) RAT, such as WCDMA or another legacy RAT.

At a later time, the BB module may determine, at 550, that service has been restored with the NW via the first RAT, e.g., at an acceptable performance level. For example, the BB module may determine success of a cell selection criteria check with the serving cell, resolution of a RACH failure, resolution of an RRC connection error, etc.

In response to this determination at 550 that service has been restored, the BB module may, at 552, provide an indication to the GT module that the user device has an operational service connection to the NW via the first RAT. For example, the indication may be, or be included in, an in-service message, in some scenarios, though other formats are also possible.

In response to receiving the indication at 552, the GT module may, at 554, create new IMS PDN context and activate IMS PDN services, and may inform any clients of the GT module of the change. The GT module may also, at 556, provide to the BB module a request to establish an IMS PDN connection with the NW, which may include establishing IMS bearers. The request may include at least a portion of the IMS PDN context created at 554. The GT module may also, at 558, provide to the IMST module an indication that connectivity to the network has been established (e.g., Connectivity=1) and/or an indication that the GT module has activated IMS PDN services (IMS PDN activation indication).

In response to the request at 556, the BB module may establish an IMS PDN connection with the NW. For example, the BB module may exchange messaging with the NW, e.g., to activate default EPS bearers, such as transmitting to the NW an ACTIVATE_DEFAULT_EPS_BEARER_CONTEXT_REQUEST message and receiving from the NW an ACTIVATE_DEFAULT_EPS_BEARER_CONTEXT_ACCEPT message, and/or any other appropriate message exchange for establishing an IMS PDN connection.

In response to the indication at 558, the IMST module may, at 560, activate the IMS stack. Once the connection has been established between the user device and the NW, the IMST module may initiate SIP signaling. For example, the IMST module may use the IMS PDN connection (e.g., IMS bearers) established by the BB module to exchange SIP messages to perform IMS registration with the NW. In some scenarios, this may include some handshaking procedure. For example, at 562, the IMST module may provide to the NW an IMS registration request (e.g., IMS SIP REGISTER). The NW may respond, at 564, with a credential challenge (e.g., 401 UNAUTHORIZED). At 566, the IMST module may provide another registration request (e.g., IMS SIP REGISTER), including appropriate authentication credentials, (e.g., authentication key, etc.). The NW may respond, at 568, with an approval message (e.g., 200 OK), acknowledging IMS registration. Other messages may also, or alternatively, be exchanged to perform IMS registration with the NW.

In response to successful IMS registration, the IMST module may, at 570, update a record of the IMS registration state to active (e.g., for SMS and/or voice messages).

As can be seen from the example of FIG. 5, significant messaging and processing may be performed in the course of deregistering and registering IMS service each time a service connection is interrupted between the user device and the network. This may consume significant power at the user device, and may add congestion on the air interface.

FIG. 6 illustrates another example, showing a signal flow diagram of a user device managing IMS SIP signaling while experiencing a high-power mode scenario, according to some embodiments. Specifically, high-power mode is a mode in which the user device expressly interrupts IMS service in response to conditions that result in the IMS service demanding an undesirably high power usage. As illustrated, the signal flow may include signals between the NW, the BB module, the GT module, and the IMST module, e.g., as defined with regard to FIG. 5.

As illustrated in FIG. 6, the signal flow may begin at 602 with the user device camped on a serving cell according to a first RAT that supports packet-based telephony (e.g., LTE), and with an IMS PDN connection established. The camping procedure and the IMS PDN establishment may have been performed according to any method known in the art.

At 604, the BB module may determine that conditions are satisfied to trigger high-power mode. For example, the BB module may determine that the radio interface between the user device and the NW is poor. As a specific example, the BB module may determine that a link quality metric of the interface such as the Reference Signal Received Power (RSRP), or other metric of signal strength or link quality (e.g., RSRQ, RSSI, etc.), has dropped below a certain (e.g., predetermined) level (e.g., −125 dBm). Other examples of conditions that may lead to a determination that the radio interface is unacceptably poor may include UL RACH failure count reaching a threshold number within a specified time window; poor UL and/or DL throughput at the cellular level; reaching a threshold number of radio link layer resets; the cellular protocol stack receiving from the physical layer a threshold number of out-of-sync indications; or average Tx cost per bit reaching a threshold value. Such a poor connection may result in significantly degraded performance, even though the interface may still be considered to be in service according to the network's minimum service requirements. For example, a low RSRP value may result in the NW failing to receive signals transmitted by the user device, and/or in the user device failing to receive acknowledgement signals and/or other downlink communications from the NW. These conditions may result in frequent retransmission by the user device, as well as increasing transmission signal power. Both of these results increase power consumption by the user device, as well as poor user experience. According to some embodiments, the user device may react to such conditions by triggering high-power mode, which interrupts IMS service, in order to force the user equipment to switch to a different connection, such as by falling back to a circuit-switched RAT. This power-mitigation scheme may prevent rapid power drain in poor communication environments, or in various other scenarios.

In response to determining at 604 that conditions are satisfied to trigger high-power mode, the BB module may, at 606, provide to the GT module an indication that the conditions have been met and/or an instruction for the GT module to implement high-power mode. Thus, the indication at 606 may function in much the same manner as the out-of-service indication illustrated at 506, in that each message communicates to the GT module that the wireless communication link to the NW is not performing at an acceptable level. In some scenarios, the BB module may start a Link Quality Metric (LQM) guard timer, at 605, in response to determining at 604 that the conditions are satisfied to trigger high-power mode, and may delay providing the indication at 606 until expiration of that timer. If the BB module determines that the high-power conditions cease to be met before expiration of the LQM guard timer, then the indication may not be sent at 606. This may prevent the user device from entering high-power mode in scenarios in which the high-power conditions are met only briefly. The LQM guard timer may have a duration of, e.g., several minutes, though other durations are also possible.

In response to receiving the indication at 606, the GT module may, at 608, initiate deactivation of the IMS PDN connection, and may notify any clients of the GT module of the IMS PDN deactivation. This may include locally deregistering from IMS PDN connection and/or clearing (e.g., removing from memory) any IMS PDN context information. The GT module may also, at 610, provide an indication to the BB module that the IMS PDN connection is being terminated gracefully, which may result in the BB module stopping exchange of payload data traffic with the NW via the first RAT. The GT module may also, at 612, provide to the IMST module an indication that connectivity to the network is being terminated (e.g., Connectivity=0) and/or an indication that IMS PDN connection is being deactivated (IMS PDN deactivation indication).

In response to the indication at 612, the IMST module may perform IMS deregistration with the NW, via the bearers established by the BB module. For example, at 614, the IMST module may provide to the NW a deregistration message (e.g., IMS SIP DEREGISTER). The NW may respond, at 616, with an approval message (e.g., 200 OK), acknowledging IMS deregistration. Other messages may also, or alternatively, be exchanged to perform IMS deregistration with the NW.

In response to successful IMS deregistration, the IMST module may, at 618, update a record of the IMS registration state from active to terminated (e.g., for SMS and/or voice messages), clear from memory any IMS registration context information, and/or deactivate the SIP signaling stack. Additionally, the BB module may terminate the PDN connection with the NW. For example, the BB module may exchange messaging with the NW to terminate the connection, such as by transmitting to the NW a PDN_DISCONNECT_REQUEST message, receiving from the NW a DEACTIVATE_DEFAULT_EPS_BEARER_CONTEXT_REQUEST message and responding by transmitting to the NW a DEACTIVATE_DEFAULT_EPS_BEARER_CONTEXT_ACCEPT message, and/or any other appropriate message exchange for terminating an PDN connection.

It should be understood that, during the period in which the user device is operating in high-power mode, the user device may, in some scenarios, be capable of communicating with the network via another (non-IMS) RAT, such as WCDMA or another legacy RAT.

At a later time, the BB module may determine, at 650, that conditions to exit high-power mode have been met. For example, the BB module may determine that a link quality metric of the interface has improved to at least a certain (e.g., predetermined) level, or may otherwise determine that the wireless communication link is performing at an acceptable level.

In response to this determination at 650, the BB module may, at 652, provide to the GT module an indication that the high-power mode exit conditions have been met and/or an instruction for the GT module to exit high-power mode.

In response to the indication at 652, the GT module may at 654, create new IMS PDN context and activate IMS PDN services. The GT module may also perform additional steps to cause IMS registration to be performed (e.g., by the IMST module and/or the BB module), substantially as described with regard to FIG. 5. For example, elements 656-670 of FIG. 6 may correspond to elements 556-570 of FIG. 5, mutatis mutandis.

As can be seen from the example of FIG. 6, significant messaging and processing may be performed in the course of deregistering and registering IMS service each time the user device is place in high-power mode. This may consume significant power at the user device, and may add congestion on the air interface.

Figure 7:
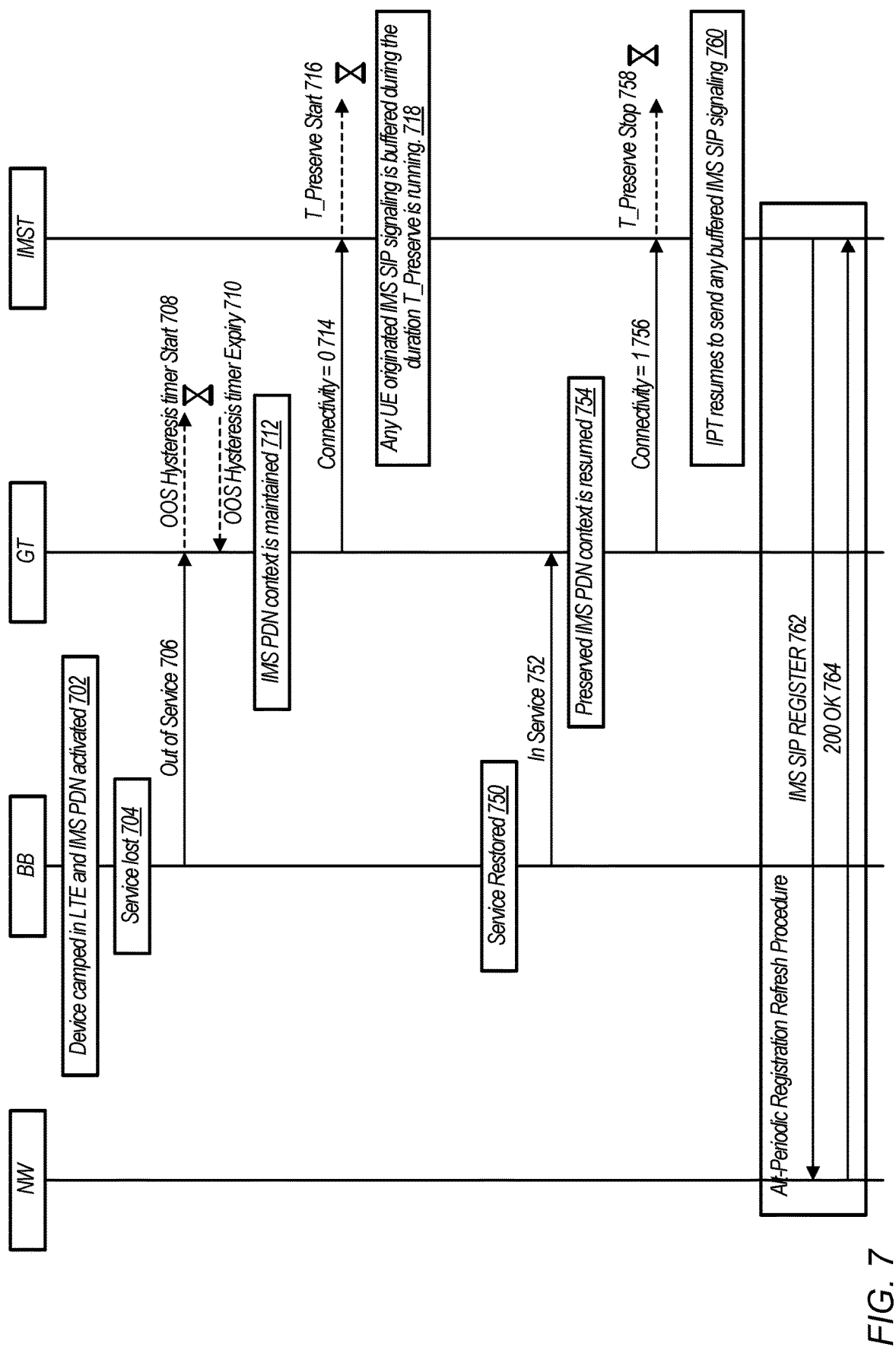
FIG. 7 illustrates an example signal flow diagram of an improved user device managing IMS SIP signaling while experiencing an out-of-service scenario, according to some embodiments.
Figure 8:
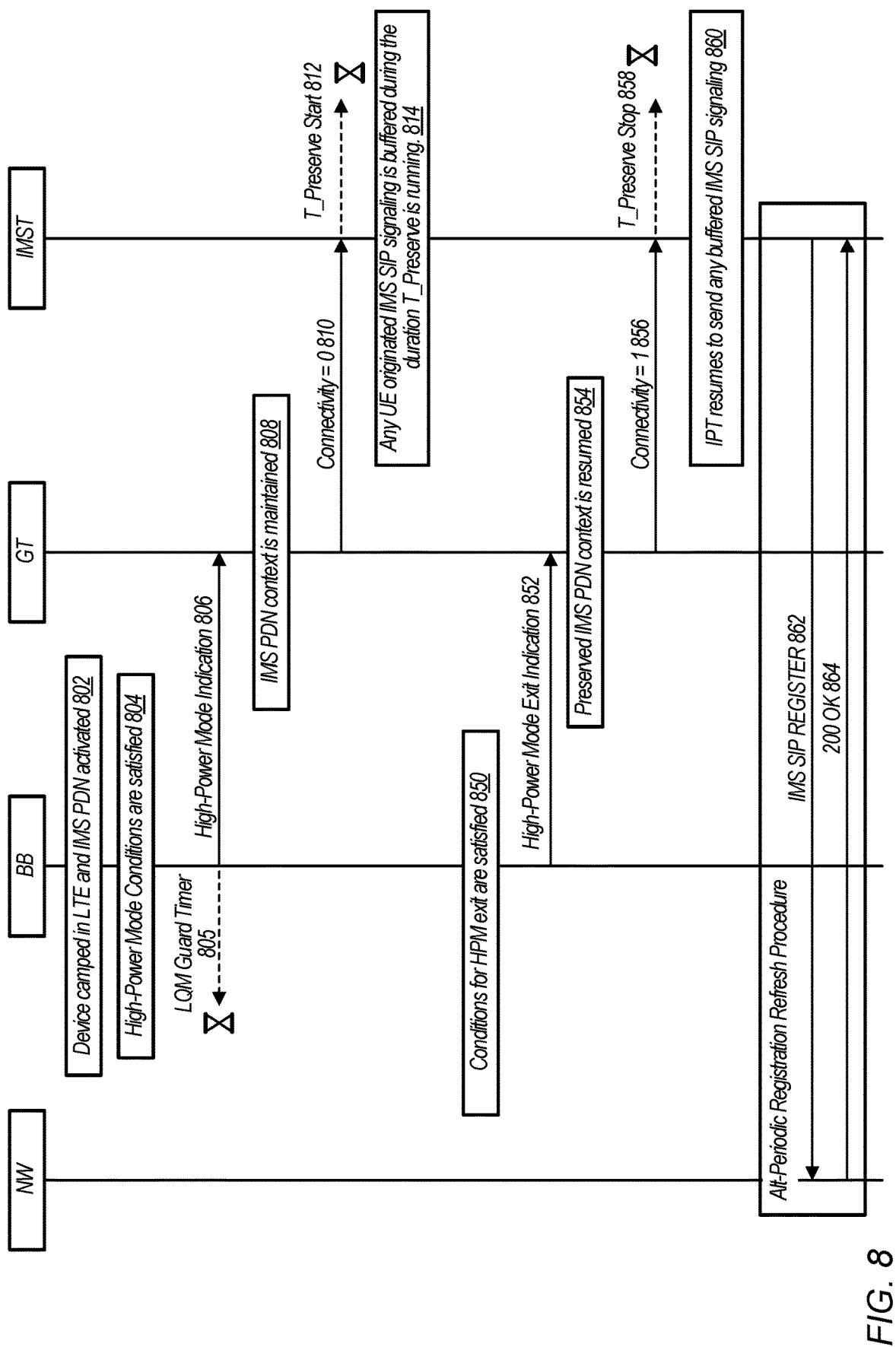
FIG. 8 illustrates an example signal flow diagram of an improved user device managing IMS SIP signaling while experiencing a high-power mode scenario, according to some embodiments.
Figure 9:
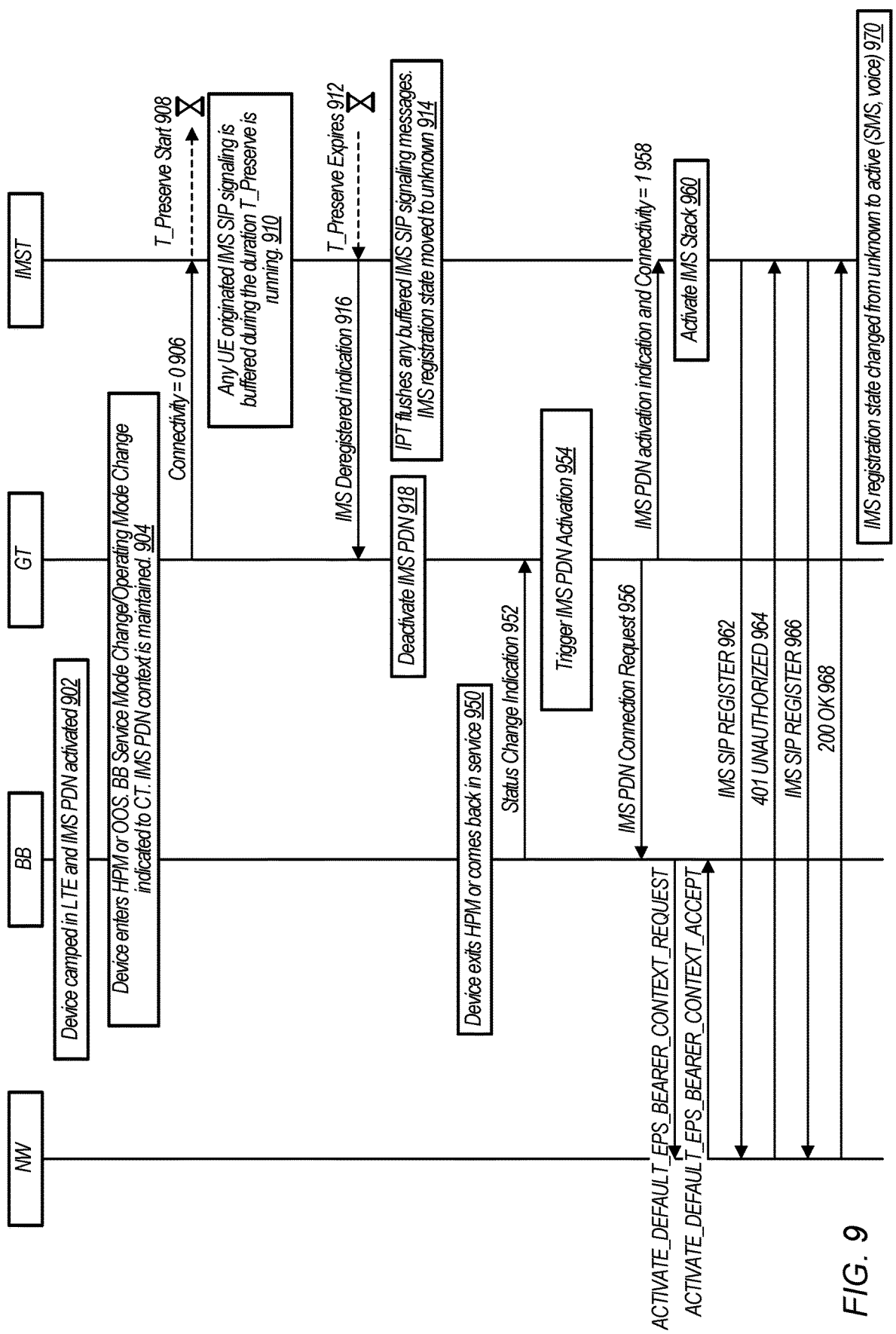
FIG. 9 illustrates an example a signal flow diagram of a scenario in which a timer of either of FIG. 7 or FIG. 8 expires prior to restoration of a usable connection between the user device and the network, according to some embodiments.

FIGS. 7-9—Improved Efficiency Through Suspension of IMS Registration

In some scenarios, inefficient signaling and the resulting negative effects may be reduced or eliminated by suspending, rather than canceling, IMS registration. FIGS. 7-8 illustrate examples of two such scenarios, according to some embodiments.

FIG. 7 illustrates a signal flow diagram of a user device managing IMS SIP signaling while experiencing an out-of-service scenario, according to some embodiments. As illustrated, the signal flow may include signals between the NW, the BB module, the GT module, and the IMST module, e.g., as defined with regard to FIG. 5.

The signal flow illustrated in FIG. 7 may begin identically to that of FIG. 5. For example, elements 702-710 of FIG. 7 may correspond to elements 502-510 of FIG. 5, mutatis mutandis. However, at 712, in response to expiration of the OOS hysteresis timer, rather than deactivating the IMS PDN connection, as was done at 512, the GT module may instead merely suspend the connection, maintaining the IMS PDN context for use in case service is restored. The GT module may also, at 714, provide to the IMST module an indication that connectivity to the network has been interrupted (e.g., Connectivity=0). However, the GT module may not provide an indication or instruction that IMS PDN has been deactivated.

In response to receiving the indication at 714, the IMST module may, at 716, start a message preservation timer T_Preserve. In some scenarios, T_Preserve may be implemented as part of the IMS stack. The IMST module may also, at 718, begin to buffer any IMS SIP signaling originated by the user device, while T_Preserve is running. Specifically, the IMST module may continue to operate the IMS stack, may preserve any IMS registration context information, and may maintain the IMS registration state as active (e.g., the IMST module may not update the IMS registration state to terminated). Because connectivity to the NW has been interrupted, the IMST module may not immediately send the IMS SIP signaling to the BB module according to normal procedures. However, the IMST module may buffer any such IMS SIP signaling messages, to be sent if service is restored.

At a later time, the BB module may determine, at 750, that service has been restored with the NW via the first RAT. For example, the BB module may determine success of a cell selection criteria check with the serving cell, resolution of a RACH failure, resolution of an RRC connection error, etc.

In response to this determination at 750 that service has been restored, the BB module may, at 752, provide an indication to the GT module that the user device has an operational service connection to the NW via the first RAT. For example, the indication may be, or be included in, an in-service message in some scenarios, though other formats are also possible.

In response to receiving the indication at 752, the GT module may, at 754, resume telephony services with the stored IMS PDN context. The GT module may also, at 756, provide to the IMST module an indication that connectivity to the network has been established (e.g., Connectivity=1).

In response to the indication at 756, the IMST module may, at 758, stop (e.g., interrupt) the timer T_Preserve. The IMST module may also, at 760, resume sending IMS SIP signaling messages to the NW, including any IMS SIP messages buffered while T_Preserve was running. For example, any stored or subsequently generated messages may be sent to the NW in the order in which they were received at the IMST module. Once the buffered messages have been sent (or in response to the indication at 756), the IMST module may stop buffering new IMS SIP signaling messages, and may instead resume sending such messages, according to normal procedures. The IMST module may continue to maintain the IMS registration state as active.

In some scenarios, the IMST module may perform an IMS refresh procedure, e.g., prior to sending any IMS SIP messages buffered while T_Preserve was running, or other IMS SIP messages. For example, the IMST module may send to the NW, at 762, an IMS registration request (e.g., IMS SIP REGISTER). The NW may respond, at 764, with an approval message (e.g., 200 OK), acknowledging IMS registration. Other messages may also, or alternatively, be exchanged to perform IMS registration refresh with the NW. It should be understood that the full IMS PDN connection establishment procedure (e.g., IMS bearer establishment) and new IMS registration procedure, e.g., as illustrated in FIG. 5, may be unnecessary in the example of FIG. 7, as IMS deregistration did not occur. This may noticeably reduce messaging and processing performed by the user device, which may reduce power consumption at the user device, as well as congestion on the air interface. User experience may also be improved, as IMS SIP messaging may be resumed more quickly.

In some scenarios, the IMST module may dynamically or intelligently determine to not send one or more of the IMS SIP messages buffered while T_Preserve was running. For example, in some scenarios, the IMST module may receive and buffer a deregistration message, which would result in IMS SIP deregistration with the NW. However, prior to resumption of sending IMS SIP signaling at 760, the IMST module may receive a registration message, which would result in a new IMS registration with the NW. In such a scenario, the IMST module may determine that the two messages negate each other, and would result in no net change in IMS SIP state. Therefore, the IMST module may omit (e.g., remove or not save) both messages from the buffer, such that neither message is sent once service is restored. Other IMS SIP messages may remain buffered, and may be sent once service is restored, as described above. This may significantly reduce signaling once service is restored. Other messages may be similarly omitted if the IMST module determines that the messages are outdated, e.g., such that the messages would have no benefit or would be detrimental, if sent upon resumption of sending IMS SIP signaling at 760.

FIG. 8 illustrates another example, showing a signal flow diagram of a user device managing IMS SIP signaling while experiencing a high-power mode scenario, according to some embodiments. As illustrated, the signal flow may include signals between the NW, the BB module, the GT module, and the IMST module, e.g., as defined with regard to FIG. 5.

The signal flow illustrated in FIG. 8 may begin identically to that of FIG. 6. For example, elements 802-806 of FIG. 8 may correspond to elements 602-606 of FIG. 6, mutatis mutandis. However, at 808, in response to receiving the indication at 806, rather than initiating IMS PDN deactivation, as was done at 608, the GT module may instead merely suspend the connection, maintaining the IMS PDN context for use upon exiting high-power mode. The GT module may also, at 810, provide to the IMST module an indication that connectivity to the network has been interrupted (e.g., Connectivity=0). However, the GT module may not provide an indication that IMS PDN is being deactivated.

In response to receiving the indication at 810, the IMST module may, at 812, start a timer T_Preserve. The IMST module may also, at 814, buffer any IMS SIP signaling originated by the user device, while T_Preserve is running, e.g., in the same manner described with regard to FIG. 7. For example, the IMST module may continue to operate the IMS stack, may preserve any IMS registration context information, and may maintain the IMS registration state as active (e.g., the IMST module may not update the IMS registration state to terminated), while not sending IMS SIP signaling to the BB module according to normal procedures. However, the IMST module may buffer any such IMS SIP signaling messages, to be sent upon exiting high-power mode.

At a later time, the BB module may determine, at 850, that appropriate criteria have been met to exit the high-power mode, e.g., as described with regard to 650 of FIG. 6. In response to this determination at 850, the BB module may, at 852, provide to the GT module an indication that the high-power mode exit conditions have been met and/or an instruction for the GT module to exit high-power mode.

In response to receiving the indication at 852, the GT module may, at 854, resume telephony services with the stored IMS PDN context. The GT module may also, at 856, provide to the IMST module an indication that connectivity to the network has been established (e.g., Connectivity=1).

In response to the indication at 856, the IMST module may, at 858, stop (e.g., interrupt), the timer T_Preserve. The IMST module may also, at 860, resume sending IMS SIP signaling messages to the NW, including any IMS SIP messages buffered while T_Preserve was running. For example, any stored or subsequently generated messages may be sent to the NW in the order in which they were received at the IMST module. Once the buffered messages have been sent (or in response to the indication at 856), the IMST module may stop buffering new IMS SIP signaling messages, and may instead resume sending such messages, according to normal procedures. The IMST module may continue to maintain the IMS registration state as active.

In some scenarios, the IMST module may perform an IMS refresh procedure, e.g., prior to sending any IMS SIP messages buffered while T_Preserve was running, or other IMS SIP messages. For example, the IMST module may send to the NW, at 862, an IMS registration request (e.g., IMS SIP REGISTER). The NW may respond, at 864, with an approval message (e.g., 200 OK), acknowledging IMS registration. Other messages may also, or alternatively, be exchanged to perform IMS registration refresh with the NW. It should be understood that full IMS PDN connection establishment (e.g., IMS bearer establishment) and new IMS registration, e.g., as illustrated in FIG. 6, may be unnecessary in the example of FIG. 8, as IMS deregistration did not occur. This may noticeably reduce messaging and processing performed by the user device, which may reduce power consumption at the user device, as well as congestion on the air interface. User experience may also be improved, as IMS SIP messaging may be resumed more quickly.

In some scenarios, the IMST module may dynamically or intelligently determine to not send one or more of the IMS SIP messages buffered while T_Preserve was running, e.g., in the same or similar manner to that described with regard to FIG. 7.

In the examples of FIG. 7 and FIG. 8, it may not be feasible for the IMST module to buffer IMS SIP signaling messages indefinitely, e.g., due to memory limitations. Therefore, if T_Preserve expires prior to restoration of connectivity to the NW according to the first RAT, then the user device may take other action, e.g., as illustrated in FIG. 9.

FIG. 9 illustrates another example, showing a signal flow diagram of a scenario in which the timer T_Preserve expires prior to restoration of a usable connection between the user device and the NW according to the first RAT, according to some embodiments. This signal flow may occur within the context of either FIG. 7 or FIG. 8.

As illustrated in FIG. 9, the user device may begin, at 902, camped on a serving cell according to a first RAT that supports packet-based telephony (e.g., LTE), and with an IMS PDN connection established, as in FIG. 7 and FIG. 8. At 904, the BB module may determine that the wireless communication link is not performing at an acceptable level—e.g., either that the user device is out of service with the first RAT, as at 704 of FIG. 7, or that conditions are satisfied to trigger high-power mode, as at 804 of FIG. 8. The BB module may provide to the GT module an indication of the detected status. In some scenarios, this may involve use of the OOS hysteresis timer of FIG. 7 or the LQM guard timer of FIG. 8. As discussed with regard to FIG. 7 and FIG. 8, the GT module may suspend the IMS PDN connection and maintain the IMS PDN context for future use.

The GT module may also, at 906, provide to the IMST module an indication that connectivity to the network is not available (e.g., Connectivity=0). However, the GT module may not provide an indication that IMS PDN has been deactivated. In response, the IMST module may start the timer T_Preserve at 908 and begin buffering IMS SIP signaling messages at 910, as described with regard to FIG. 7 and FIG. 8.

In some scenarios, the duration of T_Preserve may vary by network or dynamically, based, e.g., on network performance criteria or carrier requirements. In some scenarios, a default value may be used in the absence of input from the network. Generally, the duration of T_Preserve may not effectively extend beyond the IMS registration duration, as the network may deregister the user device if the user device fails to send an IMS registration refresh message prior to expiration of the IMS registration duration. Once the network deregisters the user device, any IMS SIP messages buffered by the user device will become undeliverable. Thus, the IMS registration duration defines the maximum value of T_Preserve. However, in some scenarios, the duration of T_Preserve may be selected to be shorter, such as 10 minutes, 30 minutes, or 40 minutes, among other possible values, as out-of-service periods are not expected to commonly last longer.

In the scenario illustrated in FIG. 9, T_Preserve expires at 912 before the conditions are met for restoring service according to the first RAT (e.g., according to 750 or 850). In response, the IMST module may, at 914, take steps to terminate IMS signaling and locally deregister from IMS SIP. For example, the IMST module may update a record of the IMS registration state from active (e.g., for SMS and/or voice messages) to another state such as unknown or terminated, clear from memory any IMS registration context information, and/or deactivate the SIP signaling stack. The IMST module may also stop buffering IMS SIP signaling messages, and flush any messages previously buffered. Additionally, the IMST module may, at 916, provide to the GT module an indication that the IMST module has terminated IMS signaling (e.g., an IMS deregistered indication).

In response to the indication at 916, the GT module may, at 918, deactivate the IMS PDN connection, and may notify any clients of the GT module of the deactivation. Deactivating the IMS PDN connection may include locally deregistering from the IMS PDN connection and/or clearing (e.g., removing from memory) any IMS PDN context information.

At this point, the user device has deregistered from both IMS PDN and IMS SIP, much as in the example of FIG. 5.

At a later time, the BB module may determine, at 950, that service has been restored with the NW via the first RAT, as at 750 of FIG. 7, or that conditions are satisfied to exit high-power mode, as at 850 of FIG. 8. The BB module may provide to the GT module an indication of the detected change.

In response to this determination at 950, the BB module may, at 952, provide an indication to the GT module that the status change—e.g., that user device has an operational service connection to the NW via the first RAT. For example, the indication may be, or be included in, an in-service message, such as those shown at 752 of FIG. 7 or 852 of FIG. 8, in some scenarios, though other formats are also possible.

Because the user device was deregistered, the GT module may react to the indication at 952 much as in the scenario of FIG. 5, such as by triggering IMS PDN activation. For example, elements 954-970 of FIG. 9 may correspond to elements 554-570 of FIG. 5, mutatis mutandis.

As can be seen from FIG. 9, the user device performing the methods illustrated in either of FIG. 7 or FIG. 8, may be configured to respond appropriately in the event that service is interrupted for an unacceptable length of time.

Figure 10:
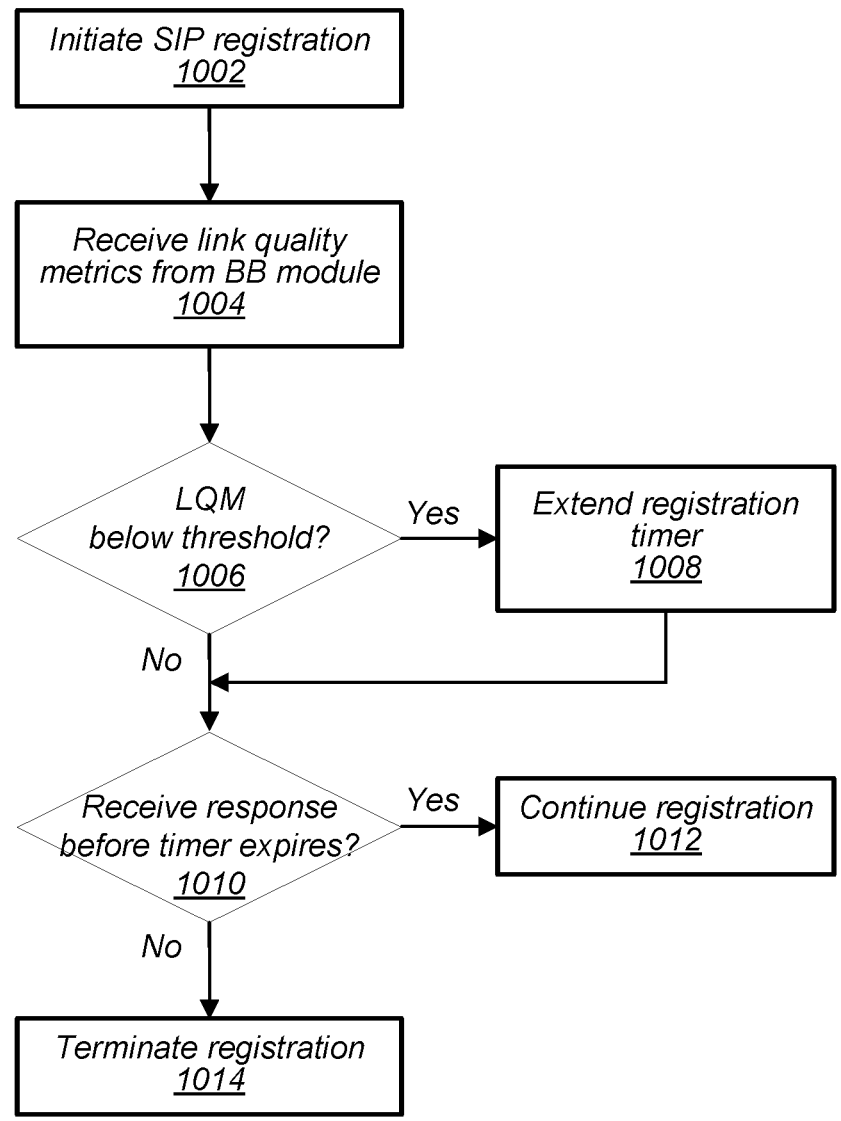
FIG. 10 illustrates an example flow chart for a method of improving efficiency during IMS registration by communicating feedback from the baseband module to the IMS stack, according to some embodiments.
Figure 11:
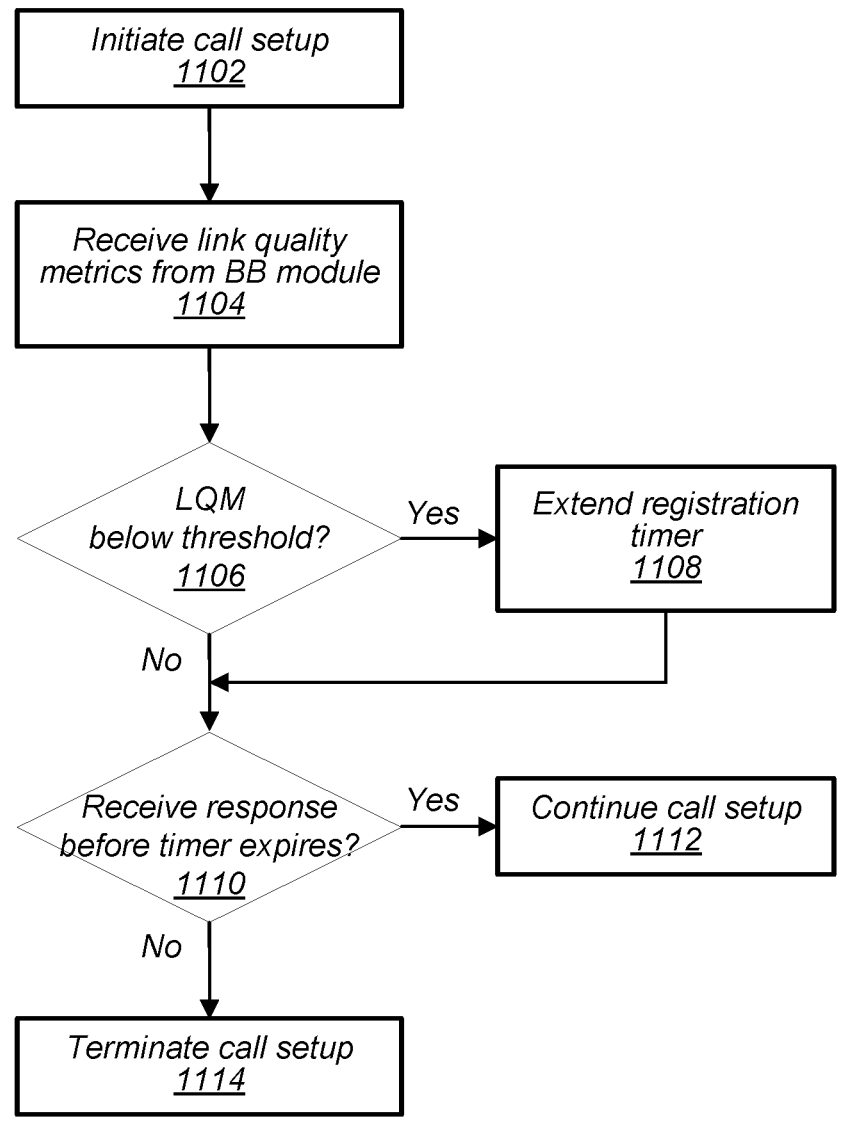
FIG. 11 illustrates an example flow chart for a method of improving efficiency during setup of an IMS-supported voice call by communicating feedback from the baseband module to the IMS stack, according to some embodiments.

FIGS. 10-11—Improved Efficiency Through Baseband Feedback

As noted above, the IMS protocol stack may be implemented on an AP (e.g., by the IMST module), such as the processor(s) 302 of FIG. 3, while the cellular protocol stack may be implemented on the BB module, such as within the cellular communication circuitry 330. Other configurations are also possible. Traditionally, the IMS protocol stack may have little knowledge of the state of the cellular protocol stack or the communication link. This may lead to inefficiencies, as the IMS stack may make decisions based on poor or outdated information.

For example, in some scenarios, the IMS stack may initiate a registration procedure, and may decide to terminate the registration procedure based on a conclusion that the network conditions are unacceptable. The IMS stack may then delay for some predetermined backoff period before attempting registration again. However, this decision may be made, e.g., based on failure to receive a response from the network within a specified timeout period at some stage of the registration procedure, and may not rely on any direct knowledge of the state of the communication link with the network. Thus, a prolonged backoff period may be initiated, even in scenarios in which the registration failed due to only a brief degradation in connectivity, such as a short-term fade.

This may especially lead to inefficiencies where particular use cases are employed outside the scope of use cases for which the network was optimized. For example, cellular carriers sometimes define short registration timeout values based on an assumption that link conditions will typically be good. However, some use cases, such as narrow-band Internet-of-things (NBIoT) implementations, which operate with much narrower bandwidths than traditional cellular communication devices, or such as wearable devices, which may have reduced transmit power and/or antenna size, may experience reduced link performance. Therefore, the short registration timeout values defined by the carrier may be inappropriate for such use cases.

Real-world testing suggests that, especially in scenarios in which the user device is experiencing worse-than-expected performance, an expected response from the network may often be received shortly after expiration of the timeout period.

FIG. 10 illustrates an example flow chart for a method of improving efficiency during IMS registration by communicating feedback from the BB module to the IMS stack, according to some embodiments. The method illustrated in FIG. 10 may be performed, e.g., by a user device, such as the communication device 106, or by a portion thereof, such as the cellular communication circuitry 330 and/or the processor(s) 302. In some scenarios, the method may be implemented by an IMS protocol stack, or by a processor of the user device, such as an AP, implementing the IMS protocol stack.

At 1002, the IMS protocol stack may initiate a SIP registration procedure. In some scenarios, the SIP registration procedure may include the signal exchange illustrated by elements 562-570 of FIG. 5. Any other appropriate SIP registration procedure as known in the art may also, or alternatively, be used. In some scenarios, initiating the SIP registration procedure may include sending to the network a registration message (e.g., as illustrated by element 562 or 566) for which the IMS protocol stack expects to receive an answer from the network (e.g., as illustrated by elements 564 or 568) within a specified timeout period. In some scenarios, the timeout period may be measured using a registration timer.

At 1004, the IMS protocol stack may receive from a BB module of the user device link quality metrics regarding conditions of the communication link between the user device and the network. For example, the link quality metrics may include any applicable data, such as SNR/SINR, RSRP, RSRQ, RSSI, cell selection criteria measurements, round-trip time, etc.

At 1006, the IMS protocol stack may determine whether the value of one or more of the link quality metrics are below a predetermined threshold value, e.g., indicating that the communication link is poor. If the value of the one or more metrics is below the predetermined threshold value, then the IMS protocol stack may, at 1008, extend the registration timer, e.g., beyond the value defined by the carrier. The time by which the registration timer is extended may be based on the particular scenario. In some scenarios, the time may be several seconds, such as 5-10 seconds. In some scenarios, the time may be determined dynamically, e.g., based on the value of one or more of the link quality metrics and/or other factors. If the value of the one or more metrics is not below the predetermined threshold value, then the IMS protocol stack may not extend the registration timer.

At 1010, the IMS protocol stack may determine whether the expected response to the registration message is received prior to expiration of the registration timer. If the expected response is received prior to expiration of the registration timer, then the IMS protocol stack may, at 1012, continue the registration process. In some scenarios, this may include completing registration. In other scenarios, this may mean sending one or more additional registration messages to the network, which messages may also have associated timeout periods for response, which may result in further iteration(s) of some or all of elements 1004-1014.

If the expected response is not received prior to expiration of the registration timer, then the IMS protocol stack may, at 1014, terminate the registration process. In some scenarios, this may include initiating a SIP deregistration process with the network. In some scenarios, this may include initiating a backoff period during which the IMS protocol stack may not initiate a new SIP registration procedure with the network. If the expected response is received after expiration of the registration timer, it may be disregarded.

It can be seen that the process illustrated in FIG. 10 may improve efficiency in performing SIP registration by enabling selective continuation of an ongoing registration attempt, in appropriate circumstances, rather than performing deregistration followed by a new registration attempt.

It should be appreciated that the flow chart illustrated in FIG. 10 is merely an example, and numerous variations thereof are possible, with additional elements, fewer elements, or reordered elements.

For example, the IMS protocol stack may perform one or more of elements 1004-1008 at various points other than as illustrated, such as prior to initiating SIP registration at 1002. Specifically, receiving the link quality metrics may be performed in response to any of a variety of factors. For example, in some scenarios, the link quality metrics may be provided by the BB module in response to the IMS protocol stack initiating SIP registration or specifically in response to sending the registration message. In some scenarios, the link quality metrics may be provided upon, or shortly before, expiration of the unmodified registration timer, such that the determination at 1010 occurs immediately upon the "no" branch of decision 1006. In some scenarios, the link quality metrics are provided by the BB module at regular intervals, or upon a status change.

In some scenarios, the IMS protocol stack may also, or alternatively, perform its own assessment of link conditions, e.g., prior to initiating SIP registration at 1002, to decide whether to initiate registration. For example, the IMS protocol stack may receive the link quality metrics from the BB module at 1004 prior to initiating SIP registration at 1002, and may not initiate SIP registration if one or more of the link quality metrics falls below a predetermined value. Additionally, or alternatively, the IMS protocol stack may send to the network a keep-alive message, and may receive a response message from the network. In some scenarios, the keep-alive message may be sent only if one or more of the link quality metrics is poor (e.g., below a specified threshold). The IMS protocol stack may consider additional metrics associated with the response message (e.g., signal strength, round-trip time, receive failure, etc.) in deciding whether to initiate SIP registration. Such a keep-alive message may include significantly less data than messages exchanged during the SIP registration procedure. Thus, initially testing the network using the keep-alive message may significantly reduce power consumption and network congestion, relative to conducting an unsuccessful SIP registration attempt.

As another example, element 1006 may include additional or alternative determinations. For example, the IMS protocol stack may determine whether the value of the one or more metrics has remained below the predetermined threshold value for less than a predetermined period of time. E.g., if the metrics have remained below the predetermined threshold for longer than the predetermined period of time, the IMS protocol stack may determine that the poor conditions are not short-term, and may thus not extend the registration timer. As another example, the IMS protocol stack may determine whether a period of poor performance, as determined based upon the received link quality metrics, has recently ended. Such a scenario may justify extending the registration timer to allow time to receive the expected response following the end of the poor performance period, even though the link quality metrics may presently exceed the predetermined threshold.

FIG. 11 illustrates a similar example flow chart for a method of improving efficiency during setup of an IMS-supported voice call (e.g., a VoLTE call) by communicating feedback from the BB module to the IMS stack, according to some embodiments. The method illustrated in FIG. 11 may be performed, e.g., by a user device, such as the communication device 106, or by a portion thereof, such as the cellular communication circuitry 330 and/or the processor(s) 302. In some scenarios, the method may be implemented by an IMS protocol stack, or by a processor of the user device, such as an AP, implementing the IMS protocol stack. The illustrated process is substantially similar to that of FIG. 10, except that a voice call is being established, as opposed to IMS registration.

At 1102, the IMS protocol stack may initiate a call setup procedure. In some scenarios, the call setup procedure may include sending to the network an Invite message (or other call setup message), for which the IMS protocol stack expects to receive an answer from the network within a specified timeout period. In some scenarios, the timeout period may be measured using a call setup timer.

At 1104, the IMS protocol stack may receive from a BB module of the user device link quality metrics regarding conditions of the communication link between the user device and the network. For example, the link quality metrics may include any applicable data, such as SNR/SINR, RSRP, RSRQ, RSSI, cell selection criteria measurements, round-trip time, etc.

At 1106, the IMS protocol stack may determine whether the value of one or more of the link quality metrics are below a predetermined threshold value, e.g., indicating that the communication link is poor. If the value of the one or more metrics is below the predetermined threshold value, then the IMS protocol stack may, at 1108, extend the call setup timer, e.g., beyond the value defined by the carrier. The time by which the call setup timer is extended may be based on the particular scenario. In some scenarios, the time may be several seconds, such as 5-10 seconds. In some scenarios, the time may be determined dynamically, e.g., based on the value of one or more of the link quality metrics and/or other factors. If the value of the one or more metrics is not below the predetermined threshold value, then the IMS protocol stack may not extend the call setup timer.

At 1110, the IMS protocol stack may determine whether the expected response to the Invite message is received prior to expiration of the call setup timer. If the expected response is received prior to expiration of the call setup timer, then the IMS protocol stack may, at 1112, continue the call setup process. In some scenarios, this may include completing/concluding the call setup process. In other scenarios, this may mean sending one or more additional call setup messages to the network, which messages may also have associated timeout periods for response, which may result in further iteration(s) of some or all of elements 1104-1114.

If the expected response is not received prior to expiration of the call setup timer, then the IMS protocol stack may, at 1114, terminate the call setup process. In some scenarios, this may include initiating a backoff period during which the IMS protocol stack may not initiate a new call setup procedure with the network. If the expected response is received after expiration of the registration timer, it may be disregarded.

It should be appreciated that the flow chart illustrated in FIG. 11 is merely an example, and numerous variations thereof are possible, with additional elements, fewer elements, or reordered elements. For example, the variations discussed with regard to FIG. 10 may similarly apply to FIG. 11.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a baseband processor configured to establish a wireless communication link with a cellular network;
at least one application processor configured to execute software instructions to:
register for Internet Protocol (IP) Multimedia Subsystem (IMS) services on an IMS Public Data Network (PDN) connection established over the wireless communication link;
receive from the baseband processor, after registering for IMS services, an indication that the wireless communication link is not performing at an acceptable level;
in response to receiving the indication that the wireless communication link is not performing at an acceptable level, begin buffering IMS SIP signaling messages generated by the UE and maintain IMS PDN context information;
receive from the baseband processor an indication that the wireless communication link has been restored to an acceptable performance level, and
in response to receiving the indication that the wireless communication link has been restored, send the buffered IMS SIP signaling messages to the cellular network using the maintained IMS PDN context information, and cease buffering of IMS SIP signaling messages generated by the UE.

2. The UE of claim 1, wherein the at least one application processor is further configured to execute software instructions to:
in response to receiving the indication that the wireless communication link is not performing at an acceptable level, maintain IMS registration context information for use in sending the buffered IMS SIP signaling messages.

3. The UE of claim 1, wherein the indication that the wireless communication link is not performing at an acceptable level comprises an indication of loss of service with the cellular network.

4. The UE of claim 1, wherein the indication that the wireless communication link is not performing at an acceptable level comprises an indication that the baseband processor will suspend communication via the IMS PDN connection due to poor performance of the wireless communication link, although service with the cellular network has not been lost.

5. The UE of claim 1, wherein the at least one application processor is further configured to execute software instructions to:
in conjunction with beginning buffering IMS SIP signaling messages, start a message preservation timer, wherein sending the buffered IMS SIP signaling messages to the cellular network is further in response to determining that the indication that the wireless communication link has been restored was received prior to expiration of the message preservation timer; and
in response to determining that the message preservation timer has expired prior to receiving the indication that the wireless communication link has been restored, clear from memory the buffered IMS SIP signaling messages.

6. The UE of claim 5, wherein the at least one application processor is further configured to execute software instructions to:
in response to determining that the message preservation timer has expired prior to receiving the indication that the wireless communication link has been restored, clear from memory IMS PDN context information and IMS registration context information.

7. The UE of claim 1, wherein the wireless communication link is established according to a first radio access technology (RAT), wherein the baseband processor is further configured to establish a second wireless communication link with the cellular network according to a second RAT during a period of time between the at least one application processor receiving the indication that the wireless communication link is not performing at an acceptable level and the at least one application processor receiving the indication that the wireless communication link has been restored.

8. The UE of claim 1, wherein the at least one application processor is further configured to execute software instructions to:
determine that one or more of the buffered IMS SIP signaling messages is outdated; and in response to determining that one or more of the buffered IMS SIP signaling messages is outdated, omit the one or more IMS SIP signaling messages from the buffer.

9. A method, comprising:
by a user equipment device (UE):
registering for Internet Protocol (IP) Multimedia Subsystem (IMS) services on an IMS Public Data Network (PDN) connection established over a wireless communication link with a cellular network;
determining, after registering for IMS services, that the wireless communication link is not performing at an acceptable level;
in response to determining that the wireless communication link is not performing at an acceptable level, beginning buffering IMS SIP signaling messages generated by the UE and maintaining IMS registration context information;
determining that the wireless communication link has been restored to an acceptable performance level; and
in response to determining that the wireless communication link has been restored, transmitting the buffered IMS SIP signaling messages to the cellular network using the maintained IMS registration context information, and ceasing buffering of IMS SIP signaling messages generated by the UE.

10. The method of claim 9, further comprising:
in response to determining that the wireless communication link is not performing at an acceptable level, maintaining IMS PDN context information for use in sending the buffered IMS SIP signaling messages.

11. The method of claim 9, wherein determining that the wireless communication link is not performing at an acceptable level comprises determining that service with the cellular network has been lost.

12. The method of claim 9, further comprising:
in response to determining that the wireless communication link is not performing at an acceptable level, suspending communication via the IMS PDN connection due to poor performance of the wireless connection link, although service with the cellular network has not been lost.

13. The method of claim 9, further comprising:
in response to determining that the wireless communication link is not performing at an acceptable level, starting a message preservation timer, wherein transmitting the buffered IMS SIP signaling messages to the cellular network is further in response to determining that the wireless communication link has been restored prior to expiration of the message preservation timer, wherein the buffered IMS SIP signaling messages are not transmitted if the message preservation timer expires prior to receiving the indication that the wireless communication link has been restored.

14. The method of claim 13, further comprising:
in response to determining that the message preservation timer has expired prior to receiving the indication that the wireless communication link has been restored, clear from memory the maintained IMS registration context information.

15. The method of claim 9, wherein the wireless communication link is established according to a first radio access technology (RAT), the method further comprising:

establishing a second wireless communication link with the cellular network according to a second RAT during a period of time between determining that the wireless communication link is not performing at an acceptable level and determining that the wireless communication link has been restored.

16. A non-transitory computer-readable memory medium storing software instructions executable by a processor of a user equipment device (UE), wherein, when executed, the software instructions cause the processor to:
register for Internet Protocol (IP) Multimedia Subsystem (IMS) services on an IMS Public Data Network (PDN) connection established over a wireless communication link with a cellular network;
receive from a baseband processor of the E, after registering for IMS services, an indication that the wireless communication link is not performing at an acceptable level;
in response to receiving the indication that the wireless communication link is not performing at an acceptable level, begin buffering IMS SIP signaling messages generated by the UE and maintain IMS PDN context information;
receive from the baseband processor an indication that the wireless communication link has been restored to an acceptable performance level; and
in response to receiving the indication that the wireless communication link has been restored, send the buffered IMS SIP signaling messages to the cellular network using the maintained IMS PDN context information, and cease buffering of IMS SIP signaling messages generated by the UE.

17. The non-transitory computer-readable memory medium of claim 16, wherein, when executed, the software instructions further cause the processor to:
in response to receiving the indication that the wireless communication link is not performing at an acceptable level, maintain IMS registration context information for use in sending the buffered IMS SIP signaling messages.

18. The non-transitory computer-readable memory medium of claim 16, wherein, when executed, the software instructions further cause the processor to:
in conjunction with beginning buffering IMS SIP signaling messages, start a message preservation timer, wherein sending the buffered IMS SIP signaling messages to the cellular network is further in response to determining that the indication that the wireless communication link has been restored was received prior to expiration of the message preservation timer, and
in response to determining that the message preservation timer has expired prior to receiving the indication that the wireless communication link has been restored, clear from memory the buffered IMS SIP signaling messages.

19. The non-transitory computer-readable memory medium of claim 18, wherein, when executed, the software instructions further cause the processor to:
in response to determining that the message preservation timer has expired prior to receiving the indication that the wireless communication link has been restored, clear from memory IMS PDN context information and IMS registration context information.

* * * * *